Oct. 29, 1929. D. D. CROSS 1,733,294
WIRE CUTTING AND STRIPPING MACHINE
Filed June 27, 1927 2 Sheets-Sheet 1

INVENTOR:
Daniel D. Cross,
by Macleod Calver Copeland & Dike
Attys.

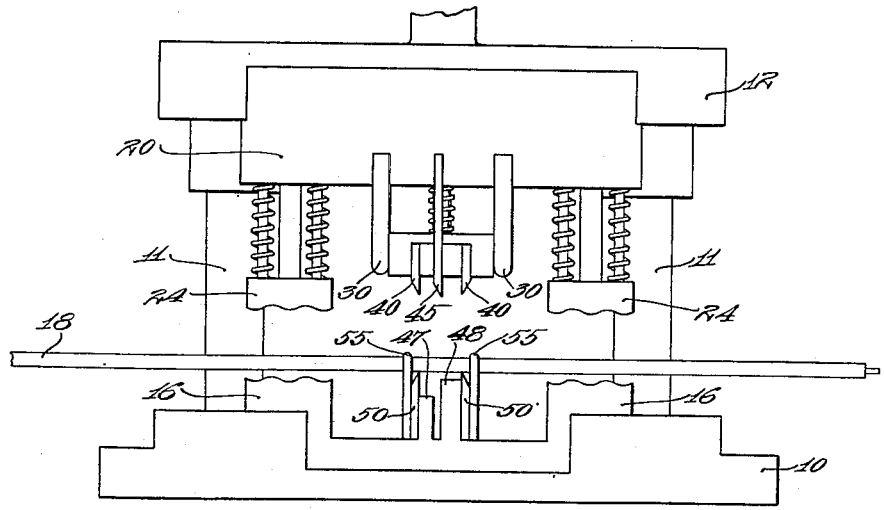
Fig-2-
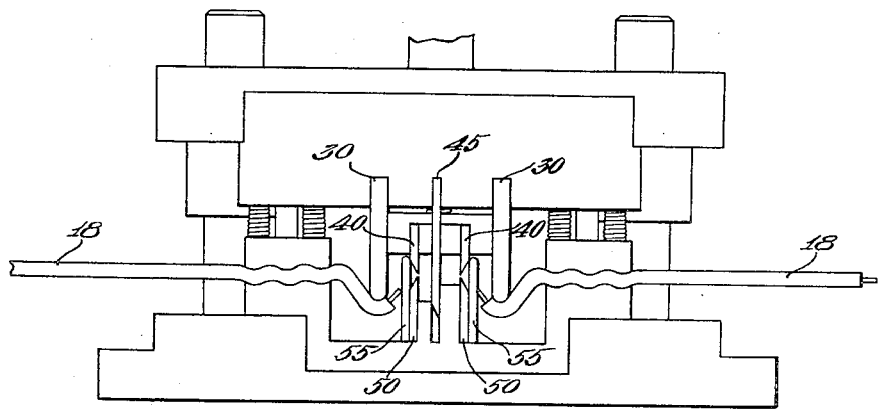
Fig-3-

Patented Oct. 29, 1929

1,733,294

UNITED STATES PATENT OFFICE

DANIEL D. CROSS, OF DETROIT, MICHIGAN

WIRE CUTTING AND STRIPPING MACHINE

Application filed June 27, 1927. Serial No. 201,576.

This invention relates to machines for cutting an electrically conductive wire and for stripping the insulation from the ends thereof.

Insulated electrically conductive wire is usually obtained on the market as a continuous wire, usually in the form of a coil. Portions of the desired length are cut from this coil and it is then necessary to strip the insulation from the portions adjacent the cut end in order to make a suitable electrically conductive connection between the wire and a source of electrical energy. In manufacturing plants where automobiles or the like are manufactured on a large production basis, considerable labor is required in cutting wires of the desired length and stripping the insulation from the ends thereof in making various connections between the battery and generator and in the ignition and lighting systems.

It is an object of the present invention to provide a machine which is adapted to cut and strip the insulation from one or more wires and thereby reduce the labor required for this purpose and thus reduce the manufacturing costs.

Before describing the invention in detail, it is desired to point out that the embodiment of the invention herein shown and described is merely by way of illustration and the invention is not thereby limited except as defined by the claims hereto appended.

Figure 1:
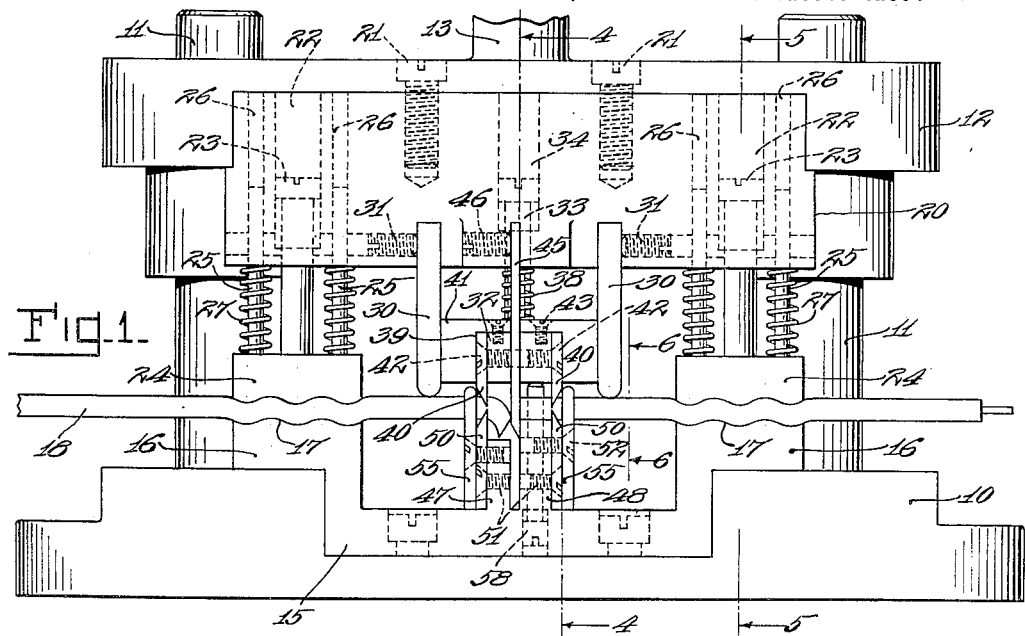
Figures 4, 5:
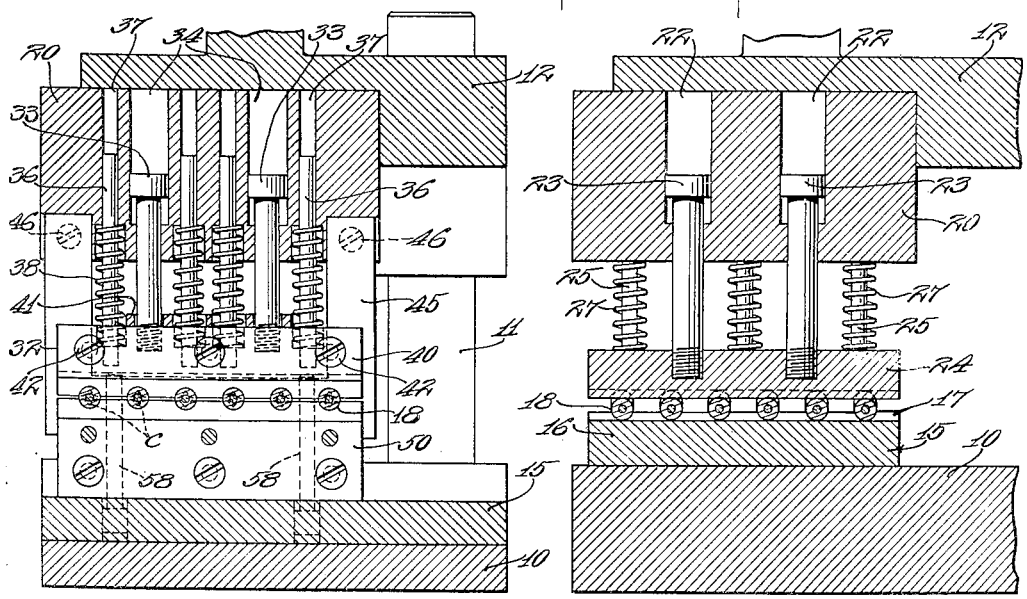
Figure 6:
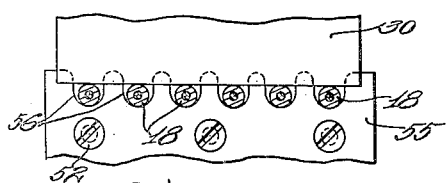

The invention will be more fully understood from the following description in conjunction with the accompanying drawings, in which:

Figs. 1, 2 and 3 are elevational views of a machine embodying the invention showing the relatively movable parts in different positions; and Figs. 4, 5 and 6 are sectional views taken upon the lines 4—4, 5—5 and 6—6 respectively of Fig. 1.

A machine is shown in the drawings illustrating one embodiment of the invention and comprises a base 10 having uprights 11 secured thereto for guiding a cross-head 12 movable relatively toward and from the base. The cross-head 12 is moved in any appropriate manner through the connection 13 along the uprights 11 as will be understood by those skilled in the art. The base 10 carries a frame 15 having a pair of upwardly extending wire grippers 16, the upper surface 17 of each of which preferably, is irregular to facilitate gripping an insulated wire 18.

As illustrated, the cross-head 12 is composed of a main frame within which a block 20 is held by screws 21. The block 20 is provided with a plurality of guideways 22 at either end thereof for guides 23 having limited movement in ways 22 and projecting upwardly from and secured to a gripper 24 having a lower surface complementary to the surface 17. The gripper 24 is further supported and guided in the block 20 by rods 25 engaging guideways 26 and is resiliently held in spaced relation to the block 20 by springs 27 surrounding the rods 25 and extending between the gripper 24 and the block 20. A pair of spaced projections or plates 30 extend downwardly from the block 20 for a purpose to be hereinafter described, said plates being rigidly secured thereto in any appropriate manner as by screws 31. A block 32 is mounted between the plates 30 and is yieldingly secured to the block 20. For this purpose a plurality of posts 33 are secured to the block 32 and extend upwardly and are guided and movable to a limited extent in ways 34 in the block 20. The block 32 is further supported and guided relative to the block 20 by rods 36 secured in a block 32 and movable in ways 37 in the block 20, the block 32 being resiliently held in spaced relation with the block 20 by springs 38 surrounding the rods 36 and extending between the blocks 20 and 32. One or more cutters 40 preferably, with a V-shaped cutting edge $c$, are mounted upon the sides of the block 32 by screws 42. A guide 41 slidably engaging the plates 30 is provided with a transverse groove 39 engaging the block 32 as is secured thereto in any suitable manner as by screws 43. At a point substantially midway between the cutters 40, the block 32 is provided with vertical grooves to receive the upwardly extending end portions of a wire cutting knife 45 which is rigidly secured to the block 20 in the cross-head in any appropriate manner as by screws 46.

The frame 15 carried by the base 10 is provided with upwardly extending spaced projections 47 and 48 to the outer surface of which cutters 50 are secured as by screws 51. Guides 55 are positioned adjacent the cutters 50 and are secured to the projections 47 and 48 as by screws 52, the upper surfaces of the guides 55, preferably, being provided with a plurality of grooves 56 each for receiving a wire 18 to be cut and stripped. The inner surface of projection 48 cooperates with the knife 45 to cut and sever the wire, the space between the projections 47 and 48 serving as a vertical groove into which the knife 45 may pass. In order to limit the relative approach of the cutters 40 and 50, one or more stops 58 are provided extending upwardly from the base 10 so as to engage the lower surface of the block 32.

The wire 18 is fed from a reel (not shown) and stretched across the paths of the knife 45 and cutters 50 so as to rest upon the irregular surfaces 17 of the grippers 16 and in one of the grooves 56 of the guides 55 and so as to extend a distance beyond the knife 45 an amount equal to the length of wire desired to be cut. The stops 58 are then adjusted so that when the block 32 is in engagement therewith the cutters 40 will be spaced from the cutters 50 an amount equal to the size of the wire 18 less the thickness of the insulation. The cross head 12 is then caused to move relatively towards the base 10 and in so doing the irregular surface of the grippers 24 will resiliently engage the wire 18 and press the same against the irregular surface 17 and hold it securely, the cutter 45 thereafter engaging and severing the wire 18. Upon further movement of the cross head 12, the cutters 40 engage the wire 18 and by cooperation with the cutters 50 cut the insulation thereof and are resiliently held in contact with the wire by the springs 38 (as shown in Fig. 1). Thereafter the projections 30 engage the surface of the wire between the grippers and the corresponding stripping cutters 40, 50 and deflect it laterally (as shown in Fig. 3), thereby drawing it lengthwise through said cutters and stripping the insulation from the portion adjacent the cut end. The cross head is then caused to move in the opposite direction to its normal inoperative position (as shown in Fig. 2) and the grippers 24 release the wire so that it may be removed from the machine.

What I claim is:

1. A machine for cutting and stripping insulated wire comprising a base, a cross-head movable relatively toward and from said base, a knife rigidly carried by and a cutter resiliently mounted in one of said relatively movable members, cooperating insulation cutters on the other of said members, said knife and cutters being relatively positioned so that the wire is severed and thereafter the insulation cut by moving said cross-head and base relatively.

2. A machine for cutting and stripping insulated wire comprising a base, a cross-head movable relatively toward and from said base, a knife carried by one of said relatively movable members, cooperating insulation cutters on said base and cross-head, gripping means for holding said wire, and means rigidly secured to said cross-head and adapted to engage said wire after said knife and cutters to move the cut end portion of said wire relative to the cutters to strip the insulation therefrom.

3. A machine for cutting and stripping insulated wire comprising a base, a cross-head movable relatively toward and from said base, a knife carried by one of said relatively movable members, cooperating insulation cutters on said base and cross-head, cooperating means carried by said base and cross-head for resiliently holding said wire, and means rigidly secured to said cross-head and adapted to engage said wire after said knife and cutters to move the cut end portion of said wire relative to said cutters to strip the insulation therefrom.

4. A machine for cutting and stripping insulated wire comprising a base, a cross-head movable relatively toward and from said base, a knife rigidly carried by and a cutter resiliently mounted in one of said relatively movable members, means in the other of said members cooperating with said knife and cutter for severing the wire and cutting the insulation, gripping means for holding said wire, and means for moving the cut end portion of said wire relative to said cutters to strip the insulation therefrom.

5. A machine for cutting and stripping insulated wire comprising a base, a cross-head movable relatively toward and from said base, a knife rigidly mounted in said cross-head, a surface on said base cooperating with said knife for cutting the wire, cutters resiliently mounted in said cross-head cooperating with cutters rigidly mounted in said base, a stop limiting the relative approach of said cutters, gripping means for holding said wire, and means for moving the cut end portion of said wire relative to said cutters to strip the insulation therefrom.

6. A machine for cutting and stripping insulated wire comprising a base, a cross-head movable relatively toward and from said base, cutters spaced on said base and cross-head for cutting the insulation of the wire, a knife on said cross-head cooperating with a surface on said base for severing the wire, gripping means for holding said wire, and means for deflecting the wire between said gripping means and stripping cutters, said parts being so arranged that when the cross-head is moved downward the wire and insulation is cut and the wire moved relative to the cutters to strip the insulation therefrom.

7. A machine for cutting and stripping insulated wire comprising a base, a cross-head movable relatively toward and from said base, a knife rigidly carried by and a cutter resiliently mounted in one of said relatively movable members, a cooperating cutter in the other of said members, means cooperating with said knife to sever the wire, a stop limiting the relative approach of said cutters, gripping means for holding said wire, and a rigid member projecting from said cross-head and adapted to engage and move said wire relative to said cutters to strip the insulation therefrom.

8. A machine for cutting and stripping insulated wire comprising a base, a cross-head movable relatively toward and from said base, a knife rigidly carried by and a cutter resiliently mounted in one of said relatively movable members, a surface cooperating with said knife and a cutter in the other of said members, a rigid projection carried by said cross-head, said cutters being positioned between and spaced from said projection and knives, and cooperating resiliently acting wire grippers on said base and cross-head and on the opposite side of said projection.

9. In a machine for cutting and stripping insulated wire, in combination, wire gripping means, a wire severing cutter, cooperating stripping cutters, means for actuating said cutters to sever the wire and to cut the insulation at a point spaced from the severed end, and means for thereafter deflecting the wire between said gripping means and stripping cutters to draw the end portion thereof through the latter and strip the insulation therefrom.

10. A machine for cutting and stripping insulated wire, comprising a base, a cross-head movable relatively toward and from said base, a knife rigidly carried by and a cutter resiliently mounted in one of said relatively movable members, means on the other member cooperating with said knife and cutter to sever the wire and cut the insulation thereon, means resiliently mounted on said cross-head cooperating with means on said base for holding said wire, and means mounted on said cross-head for deflecting the cut end portion of said wire relative to said cutters to strip the insulation therefrom.

In testimony whereof I affix my signature.

DANIEL D. CROSS.